United States Patent
Bowie

(10) Patent No.: US 6,195,644 B1
(45) Date of Patent: Feb. 27, 2001

(54) COMPUTER PROGRAM AND SYSTEM FOR CREDIT CARD COMPANIES FOR RECORDING AND PROCESSING BONUS CREDITS ISSUED TO CARD USERS

(76) Inventor: Stuart S. Bowie, 206 Knoll Rd., Wallingford, PA (US) 19086

( * ) Notice: Subject to any disclaimer, the term of this patent is extended or adjusted under 35 U.S.C. 154(b) by 0 days.

(21) Appl. No.: 09/317,975

(22) Filed: May 25, 1999

Related U.S. Application Data

(63) Continuation of application No. 07/071,062, filed on Jul. 8, 1987, now abandoned.

(51) Int. Cl.[7] .................................................. G06F 13/00
(52) U.S. Cl. ............................................................. 705/14
(58) Field of Search ........................ 364/DIG. 1 MS File, 364/DIG. 2 MS File; 705/14, 35; 709/200; 379/90.01, 91.01, 91.02

(56) References Cited

U.S. PATENT DOCUMENTS 4,750,119 * 6/1988 Cohen et al. ......................... 364/401

OTHER PUBLICATIONS

US Credit Card Joint Marketing Ventures 1987 Elsevier Science Publishers B.V., Amsterdam.*

American, Citibank give cardholders mile for each dollar billed. (linking Master Card, Visa Card and AAdvantage; American Airlines Inc.).*

Levere, Jane Travel Weekly v46 p6(1) Apr. 13, 1987.*

Bank One, Columbus signs agreement with Continental Airlines and New York Air to offer credit card to frequent fliers. Sep. 4, 1986 PR Newswire NYPRCL7.*

Continental sets bonus on Visa card; each use earns milage points. .Godwin, Nadine Travel Weekly v45 p1(2) Sep. 11, 1986.*

New Allegis credit card to provide mileage bonus. (First Card) Deady, Tim Travel Weekly v46 p58(1) Jun. 4, 1987.*

Texas Air sees brisk repsonse to credit card bonus program. (MasterCards give holders travel points) Deady, Tim Travel Weekly v45 p1(2) Dec. 8, 1986.*

* cited by examiner

Primary Examiner—Robert Harrell

(57) ABSTRACT

A method whereby credit card companies can program their computers to record and award Bonus Program Credits offered by airlines, hotels, rental car companies, etc. and relieve the latter of the burden of maintaining such records. This Abstract is not to be construed as a complete description of the invention or to limit the scope of the disclosure of the invention or of the claims.

2 Claims, 1 Drawing Sheet

COMPUTER PROGRAM AND SYSTEM FOR CREDIT CARD COMPANIES FOR RECORDING AND PROCESSING BONUS CREDITS ISSUED TO CARD USERS

CROSS-REFERENCES TO RELATED APPLICATION

This application is a continuation of U.S. patent application Ser. No. 07/071,062 filed Jul. 8, 1987, now abandoned.

STATEMENT AS TO RIGHTS TO INVENTONS MADE UNDER FEDERALLY-SPONSORED RESEARCH AND DEVELOPMENT

This invention was not made under any Federally-sponsored program and the Federal Government has no rights in the invention.

BACKGROUND OF THE INVENTION

1. Field of the Invention

This invention relates to computer programs and systems for recording and processing data relating to consumer credit or debit card transactions with vendors who award bonus credits to such consumers.

2. Description of Related Art

Without acknowledging the same to be "prior art" within the meaning of the Patent Act, Applicant is aware only of (1) the patents cited during the examination of this application and (2) has seen advertisements for certain credit card programs—which Applicant believes were not developed until well after the present invention—whereby a certain credit card company "ties in" to a single airline. With respect to the latter, Applicant is unaware that such programs involve a system whereby the credit card company records the "Frequent Flyer" credits (or other bonus credits) offered by the airline, etc. or that any credit card company has developed any system of recording and processing bonus credits from a plurality of vendors for each card holder.

SUMMARY OF THE DISCLOSURE

Credit card companies ("CCCs") record data representing charges made by their customers to purchase a variety of products and services from vendors thereof by electronic means, in written form and otherwise. The card companies input these charges into their computers and thereafter send a bill to their card customers and remit balances due the vendors.

Certain credit card companies, such as American Express, include in their computer records information in addition to the usual basic data that all card companies record, which basic information essentially is the transaction date, name of vendor and amount charged. The additional information referred to is a more extensive description of the transaction. Thus in the case of American Express, separate entries are made for airline tickets, tickets on other forms of transpiration, hotels, car rental companies, etc. A large and growing number of the latter class of vendors offer to their customers bonuses for purchasing their services and goods, which, in turn, has generated a very significant "brand loyalty"—because their customers have an incentive to continue to purchase—and even increase their purchases—of their services and goods in order to accumulate enough credits to earn the bonuses, such as free airline trips awarded by airlines under their popular "Frequent Flyer" Programs. Vendors offering such bonuses are hereinafter sometimes referred to as "Bonus Vendors" or, for short, "BVS". Such Bonus Plans are sometimes referred to as "BPS".

Bonus Plans offered by the BVs are growing rapidly. This has been of great brand loyalty benefit, but, because the transactions involving bonuses now involve millions of computer entries per year by the BVs, the cost of gathering purchase data, inputting the same into the computers of the BVs and sending statements thereof to the Bonus Plan Customers (hereinafter "BPCS") has risen tremendously. This is especially true for those BVs who do not record their BPCs' Bonus Plan Number Identification (hereinafter "BPID") in their computers, but, rather, require their BPCs to carry cards or coupons which must be inputted by the ticket sales person (in the case of cards) or attached to the ticket (in the case of the coupon system). This requires users of the Bonus Plans to carry a large number of such cards and coupons, creates many opportunities for error on the part of the BV, results in the loss of good will on the part of the BPCs when they forget to bring their cards or coupons and thereby lose the bonus, etc.

Moreover, the need to enter such card numbers or fill out and attach the coupons at the time of purchase significantly delays the transaction time. For example, airline ticket counters at major airports are often quite crowded, creating long lines of customers waiting to purchase tickets. The need on the part of the ticket agent and their customer to convey and record the customer's BPID extends the time of the ticketing process and adds to the delay which so annoys airline passengers and causes the airlines to actually lose goodwill.

DETAILED DESCRIPTION

Figure 1:
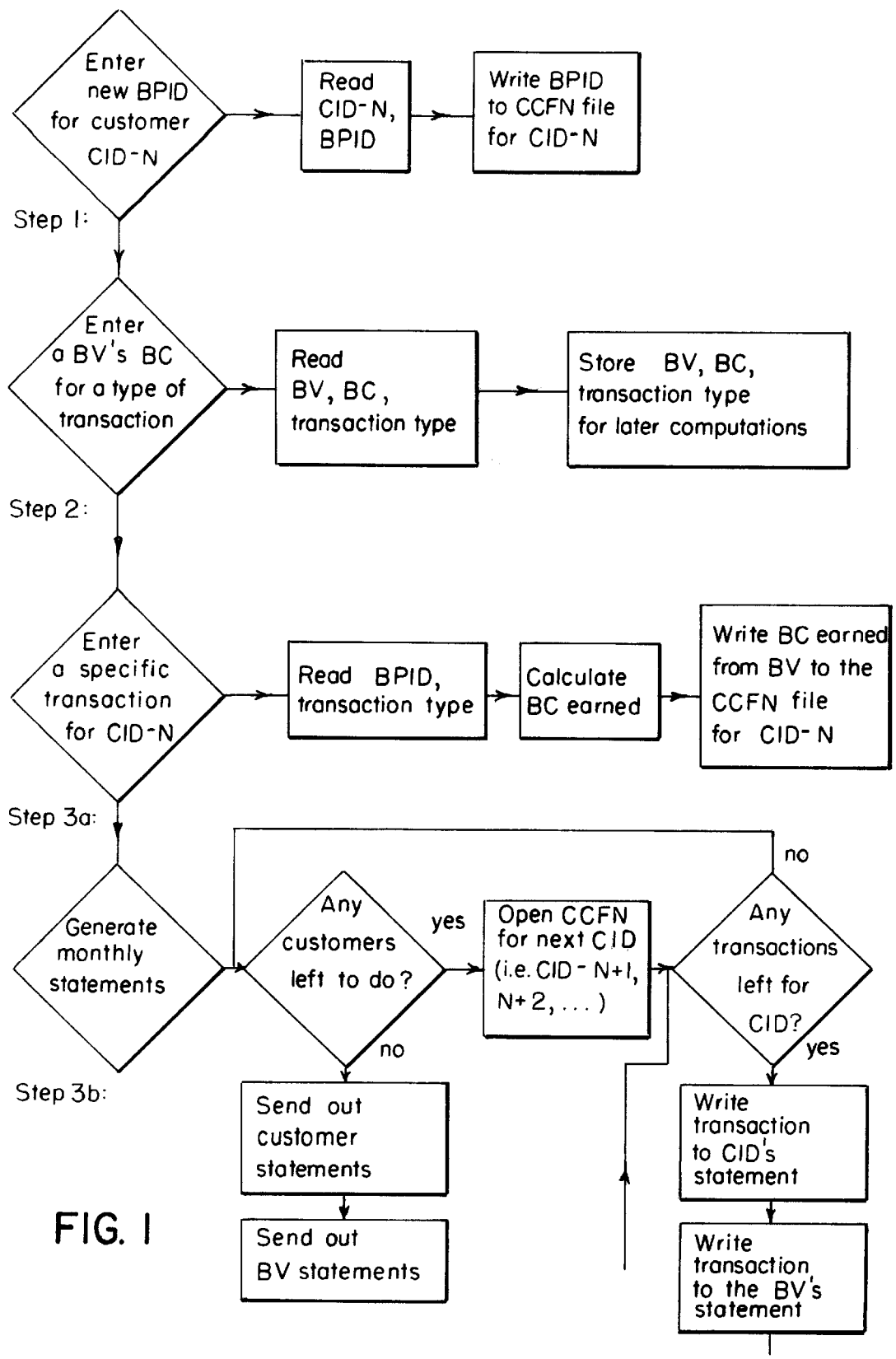
FIG. 1 is a schematic diagram representing a flow chart of the computer program of the present invention.

In this description, abbreviations are used as follows:
credit or debit card=CC
customer=C
computer program=CP
credit card company=CCC
computer program of the credit card company=CCCP
credit card holder=CCH
bonus credit=BC
bonus plan=BP
card identification number=CID or CCN
bonus plan identification number=BPID
vendor=V
computer system=CCS
bonus vendor=BV
bonus plan customer=BPC
bonus transaction=BT
customer file number=CCFN The basic concept of this invention is to preserve the Bonus System—and in fact, to dramatically improve its accuracy and efficiency—by providing a computer program ("CP") whereby, after an appropriate agreement is reached between the Card Company ("CCC") and the BV, the BV supplies the CCC with the BPIDs of its BPCs and the CCC—and not the BV—maintains the Bonus Transactions ("BTs") of the BV's BPCs and sends those BPCs a periodic statement of their various Bonus Credit ("BCs") for each BP to which they belong and whose BV has given their BPIDs to the CCC. This statement most conveniently and inexpensively should be sent to the CCCs' customers with their usual monthly statement and a copy of the BP credit portions of the statement would at the same time be transmitted to the BVs listed on the statement—most efficiently by electronic means.

Clearly, this new method has tremendous benefits to all concerned: (1) The BV preserves its brand loyalty while being relieved of the tremendous and increasing accounting and computer costs of maintaining its BP; (2) The CCC will derive at least three tremendous benefits: (a) the BVs will be willing to pay the CCC a significant sum for the cost-saving to the BV; (b) the CCC—especially if it obtains exclusive rights to this invention—will induce its customers to dramatically increase their use of the CCC's cards because its customers will be relieved from the annoying burden of carrying around a pile of credit cards and coupons; (c) new customers will be induced to become card holders of the CCC for the same reason referred to in (c); (3) BPCs will obtain great benefits, including those mentioned, plus the far greater assurance that their BPTs and BCs are accurately recorded on their account. Moreover, as indicated, the Public will generally benefit because the adoption of this method will reduce the ticketing or other transaction time especially at airports and car rental counters and hotel desks.

Before describing the method of the present invention in detail, it should be noted that it is expressed in a series of linguistic steps in universal form. This is because the CCCs use a wide variety of computers, computer programs and the latter may be expressed in different program "language", such as Fortran, etc. However, once the method of this invention is set forth, it will be readily understood in the Computer Programming Art how to translate the method into a particular computer language and then into a program for a particular computer system. This is not an attempt to avoid teaching the so-called best mode of practicing the invention because the best mode is taught herein. Rather, it is to avoid the impracticality of setting forth a potentially huge number of specific computer language programs which may be employed once this invention is understood and which should be apparent to those skilled in the art. Moreover, to limit the teachings of this invention to specific modes would only be to invite persons skilled in the art to utilize the invention and avoid infringement by selecting a non-specified language or program, which would defeat the overall Constitutional purpose of protecting inventions broadly.

The basic method of this invention is as follows:

1. The CCC enters the BV BPID for each CCC Customer in the CCC's computer program under the CCC's file for that customer ("CCFN");

2. The CCC enters the BV's Bonus Credits ("BCs") for each type of transaction by a BPC of that BV. (For example, the BV may be an airline which offers credits based upon mileage flown, in which case the BV supplies the CCC with the mileage between airports it serves and the BCs per mile to enable the CCC to compute and add up the total mileage BCs per month (or during any other period);

3. When the BPC uses the CCC's credit card for a transaction involving BCs, the CCC computer creates a sub-file under the CCCFN of that BPC and records the BCs for each transaction and, thereafter periodically, such as with the monthly statement sent to the BPC by the CCC, sends a statement showing the BCs for each BV showing the individual transaction and BCs for each transaction, together with an aggregate thereof, with a copy thereof to the BV.

In more detail, FIG. 1 is a flow chart depicting the method or system of one preferred embodiment of the present invention. (The terms "method" and "system" are used synonymously. Moreover, the sequence of steps described is optional, as is the "looping back" after the completion of each step to the starting point.)

Thus, the legend "Start" 20 indicates the beginning of the program. Step 30 determines whether the operator should enter a new BPID into the computer system for a given CID-N. (The term "operator" includes human operators such as those who input information by a keypunch system plus magnetic, optical and other devices which are means for inputting information into a computer.)

If the answer in step 30 is "Yes", then a CID-N and its BPID are input into the computer system by the operator in Step 31. In Step 32, the BPID is recorded in the computer under the CCFN file for CID-N. The system then optionally loops back to the starting point 20.

On the other hand, if no new BPID is to be assigned in step 30, the system progresses to step 40 where it is determined whether their is a BC for a BV for the type of transaction to be recorded. If the answer is "Yes", the BV, BC and transaction type is input at 41 by the operator and stored at 42 for subsequent computations. Again, optionally, the program loops back to starting point 20.

If a "No" answer was made at step 40, then the system determines whether a specific transaction for a CID-N should be entered. If the answer to that question is "Yes", the BPID, CID-N and transaction type are input at 51. At 52, the BC earned for the transaction is calculated. At 53 the BC earned from the BV is recorded in the CCFN file for that customer.

Then, optionally, the program loops back to starting point 20. At step 60, the system determines whether periodic (e.g., monthly) statements are to be generated. If so, i.e., a "Yes" answer, the CCFN file for the CID-s (CID-N+1, N+2 . . . ) is processed, one CID per cycle. Thus, for each transaction for each given CID, the system at step 62 determines if there are any transactions to be recorded ("any left" ?.) for that CID. If "Yes", then at step 63 the transaction is added to the monthly (or other periodic) statement for that CID. In step 64 the transaction i5 added to the BV's periodic (such as monthly) statement.

The CID described above may have additional transactions during the period. Thus, as shown by loop 65, the system repeats steps 62–64 to record all transaction during the period. When there are no additional transactions during the period for that CID, means 62 reports that there are no more and means 69 tallys the transactions during the period by that CID.

In the next step means 66 determines whether there are any other CIDs remaining whose transactions require processing. If so, or "Yes", the system loops back to step 61 and repeats steps 62–69 for each additional CID until the data for all CIDs has been processed.

Finally, when the data for all customers has been processed, step 66 yields a "No" answer. At this point, in step 67, Customer Statements are transmitted, as well as BV Statements to Vendors at step 68.

Optionally, after the above, the system can loop back to Start 20 and progress through steps 30, 40, 50 and 60 and, if there are negative answers at each of those steps, be terminated at "Stop" 70.

As indicated, the present invention encompasses a system for electronically processing data representing transactions by a customer (C) who uses a credit or debit card (CC) issued to C by a card company (CCC), which CCC assigns a card number (CID) to said CC and which CCC records charges made by C in a computer system (CS), and wherein C is a member of a bonus plan (BP) operated by a vendor (V or BV) of goods and/or services pursuant to which V awards C bonus credits (BC) for purchases from V, and B has assigned C a bonus plan identification number (BPID) to be used in connection with purchases from V for purposes of awarding BCs, said system comprising:

a) means for entering into the Cs the CID for C which is accomplished by input or read means 31;

b) means for entering into the Cs the BPID for C which is also accomplished by means 31.

c) said CS system having means for entering into it purchases from V by C using the CC and calculating the BC for each purchase from V by C. This is accomplished by means 50–53.

d) transmitting the tally to C and V on a periodic basis. The tally means is 69 and the means for transmitting such statements are 67 and 68.

The teachings of the claims which follow are hereby incorporated as an integral part of this specification.

What is claimed is:

1. A method of processing transactions by a customer who has been issued a credit or debit card by a card issuing company which has a computer system, wherein said customer uses the card to purchase goods or services from a plurality of vendors, and wherein two or more of such vendors each maintain a bonus plan, and wherein each of said bonus vendors assigns the customers who buys goods or services from said bonus vendors a bonus plan identification number for issuing bonus credits to said customer as a reward for purchasing goods or services from said bonus vendors, said method comprising:

a) entering data in the computer system representative of each purchase transaction by said customer from each of said bonus vendors;

b) instructing the computer system to individually itemize the bonus credit earned by said customer with each bonus vendor from whom said customer received bonus credits during a period, said itemization being performed pursuant to the terms of a bonus vendor plan;

c) instructing the computer system to prepare said individually itemized bonus credits for each bonus vendor individually in a form for reporting to said customer individually listing each bonus vendor with each individually itemized bonus points.

2. A method of programming a credit card company computer wherein the company issues and maintains accounts for a plurality of cardholders, comprising the steps of:

a) assigning a credit card account number to each cardholder;

b) entering in the program names of a plurality of vendors of goods and services who grant cardholders awards based on bonus points earned for purchasing goods or services using the card;

c) individually itemizing the total bonus points awarded to each cardholder for each vendor to provide a plurality of separate bonus point tallies, each tally being associated with only one vendor and each tally individually representing the bonus points awarded to the cardholder for said one vendor based upon use of the credit card by the cardholder; and d) storing the individually itemized bonus points on a readable format.

* * * * *